(12) United States Patent
Drane et al.

(10) Patent No.: US 7,053,296 B2
(45) Date of Patent: May 30, 2006

(54) FLUSH POKE-THROUGH FITTING

(75) Inventors: Mark R. Drane, Germantown, TN (US); Daniel K. Michaelis, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 100 days.

(21) Appl. No.: 10/736,115

(22) Filed: Dec. 15, 2003

(65) Prior Publication Data

US 2005/0126809 A1    Jun. 16, 2005

(51) Int. Cl.
*H02G 3/04*    (2006.01)

(52) U.S. Cl. ............... 174/48; 174/50; 174/53; 220/3.3; 52/220.8

(58) Field of Classification Search ......... 174/48, 174/53, 58, 57, 49, 54, 55; 220/3.2, 3.3, 220/3.4, 3.5, 3.6, 3.7, 3.8, 3.9; 52/220.5, 52/220.7, 220.8; 439/535, 536, 650, 652; D13/152, 139.5

See application file for complete search history.

(56) References Cited

U.S. PATENT DOCUMENTS

| | | | |
|---|---|---|---|
| 4,770,643 A * | 9/1988 | Castellani et al. ........... 174/48 |
| 5,003,127 A | 3/1991 | Sosinski et al. |
| 5,032,690 A | 7/1991 | Bloom |
| 5,466,886 A | 11/1995 | Lengyel et al. |
| 5,467,565 A | 11/1995 | Bowman et al. |
| 5,486,650 A | 1/1996 | Yetter |
| 6,018,126 A | 1/2000 | Castellani et al. |
| 6,114,623 A | 9/2000 | Bonilla et al. |
| 6,175,078 B1 | 1/2001 | Bambardekar et al. |
| 6,307,152 B1 | 10/2001 | Bonilla et al. |
| 6,353,180 B1 | 3/2002 | DeBartolo, Jr. et al. |
| 6,395,978 B1 | 5/2002 | Whitehead et al. |
| 6,417,446 B1 | 7/2002 | Whitehead |
| 6,483,028 B1 | 11/2002 | DeBartolo, Jr. et al. |
| 6,551,130 B1 | 4/2003 | Bonilla |
| 6,612,081 B1 * | 9/2003 | Cole et al. ............... 52/220.8 |
| 6,750,395 B1 * | 6/2004 | Stout et al. ................ 174/48 |
| 6,854,226 B1 * | 2/2005 | Cole et al. ................ 220/3.8 |

* cited by examiner

*Primary Examiner*—Angel R. Estrada
(74) *Attorney, Agent, or Firm*—Hoffmann & Baron, LLP

(57) ABSTRACT

A flush poke-through fitting, with both electrical power and data communication access, includes a data jack face plate that can be replaced without disassembly of any other part of the fitting. The data jack face plate is also removable without disruption of power to the electrical outlets. Increased wiring space for flexibility in electrical outlet orientation and improved conductor organization during assembly is also provided by pins that support the electrical contacts in the electrical receptacle when assembled.

12 Claims, 14 Drawing Sheets

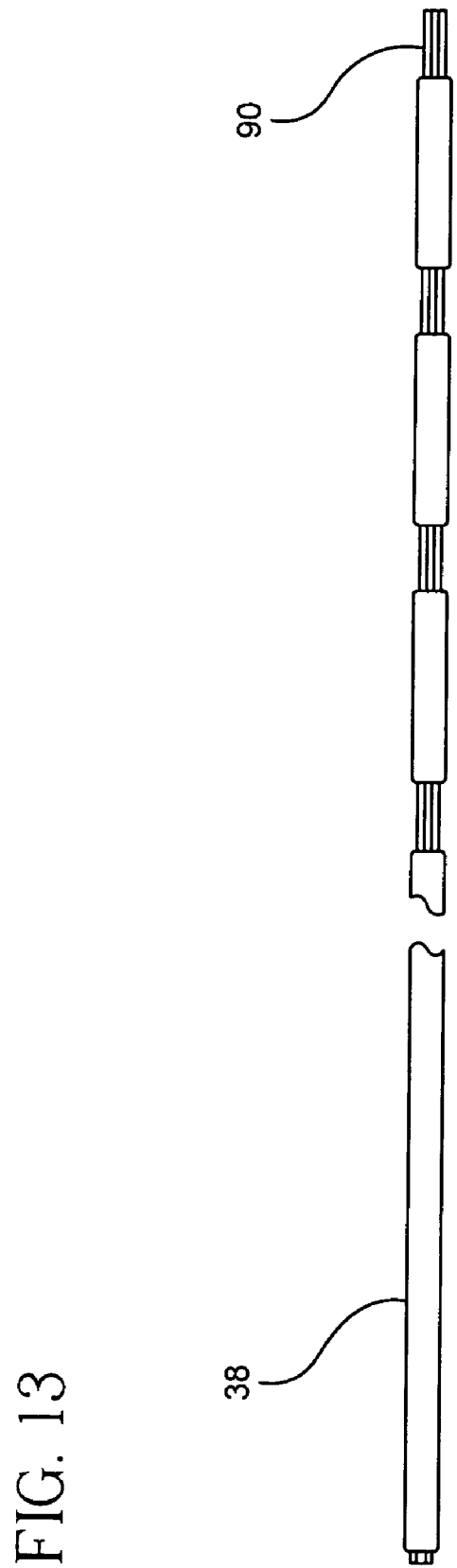

FLUSH POKE-THROUGH FITTING

BACKGROUND OF THE INVENTION

The present invention relates generally to flush poke-through fittings, and more particularly, to a flush poke-through fitting that provides easy interchangeability of data jack mounts and flexibility in the orientation of the electrical outlets.

One problem commonly encountered in the maintenance and renovation of a facility, a multi-floor office building for example, is how to safely and efficiently add access to electrical power and data communication lines in areas not provided for in the original architectural and electrical planning. Poke-through fittings have offered one alternative to the use of above-ground conduits in providing such access.

A poke-through fitting is an apparatus developed for use in an interfloor hole, typically of two (2) to four (4) inch diameter, formed by drilling through a concrete floor of a multistory building. Power and communication lines are routed beneath the floor and up through the hole, allowing access in a desired location, while avoiding the inconvenience and safety hazards of running such cables above-ground.

The installation of poke-through fittings in an existing multistory concrete slab structure not only provides additional access sites to power and communication lines, therefore increasing the potential number of office workstations, for example, but also allows a way to update or replace an outdated wiring and communications cabling infrastructure. With the rapid technological changes occurring in the communications industry, such updates are becoming more frequently necessary, often requiring different wiring schemes and new data communications connectors. A new challenge has arisen, therefore, to design a more flexible poke-through fitting that can keep pace with the ever-changing and demanding requirements of the modern workstation. The need exists for easy interchangeability of data jack mounts, and flexibility in electrical outlet orientation in the poke-through fitting.

Typically, it is desirable that a poke-through fitting be flush with the floor level to minimize tripping hazards, but flush floor fittings generally have the disadvantage of limited space within the fitting for wiring. Therefore, prior art flush fittings typically require complicated bus bar configurations to accommodate several electrical outlets. For example, U.S. Pat. No. 6,483,028 to DeBartolo, Jr. et al. discloses a poke-through fitting with four electrical outlets directly mounted to a housing and four communication jacks side-mounted in alternating fashion to the same housing, and bus bars that are molded to the particular electrical outlet configuration. In one example, one of four three-pronged electrical outlets is rotated by 180 degrees relative to the other three outlets. Three bus bars are used to connect the ground, neutral, and hot contacts, respectively, between the four electrical outlets, and are shaped to allow this particular orientation of the electrical outlets.

The poke-through devices of the prior art also lack easy interchangeability of data communication ports to accommodate variations in cabling needs. For example, the U.S. Pat. No. 6,551,130 to Bonilla, like the '028 patent discussed above, discloses a poke-through fitting that has the power receptacles and telecommunication jacks both mounted directly to the housing. Disassembly of the poke-through fitting is required to access them. Consequently, modification of the data communications wiring to modernize cabling infrastructure using the prior art poke-through fittings is cumbersome, and interchangeability of data jacks likely necessitates an interruption in electrical power service to the work area.

There is a need, therefore, for a flush poke-through device that provides both electrical power outlets and data communication ports, and allows easy interchangeability of data jack mounts and flexibility in the electrical power outlet orientation.

SUMMARY OF THE INVENTION

The present invention, which addresses the needs of the prior art, relates to a flush poke-through device, with both electrical power and data communication access, for installation in a hole in a floor structure.

The flush poke-through fitting of the present invention is adapted for installation in a substantially circular opening in a floor structure, wherein the floor structure defines a floor in a first working environment and a ceiling in a second working environment, said second working environment including a junction box. The flush poke-through fitting comprises a body having an upper and a lower end, the lower end communicating with the junction box. The body is sized for insertion within said substantially circular opening, said upper end including a receptacle region, which includes a receptacle, with at least one electrical outlet coupled thereto.

The fitting also includes a data jack face plate, wherein at least one data jack is coupled thereto, and a flange having an opening, providing access to the at least one electrical outlet and the at least one data jack. The data jack face plate is sized for removal through the opening in the flange and secured within said receptacle region by at least one fastener, which is accessible for removal through the opening in the flange. The data jack face plate may be both installed and uninstalled without removal of said flange.

The poke-through fitting of the present invention may further comprise a receptacle bottom plate secured to the receptacle, the bottom plate having a plurality of pins protruding therefrom. Additionally, the at least one electrical outlet in the receptacle includes a hot electrical contact, a ground electrical contact, and a neutral electrical contact coupled thereto, wherein each electrical contact is supported by one of the plurality of pins. The plurality of pins may be molded to the receptacle bottom plate.

A process is provided for replacing a data jack face plate in a fully-assembled poke-through device, said data jack face plate having at least one data jack secured thereto, said data jack face plate being connected to at least one data communication wire, the fully-assembled poke-through device having at least one opening providing access to said data jack face plate. The process comprises initially detaching and removing the data jack face plate from the fully-assembled poke-through device through the at least one access opening. The process further comprises disconnecting the at least one data jack from the at least one data communication wire, and providing a new data jack face plate for installation through said opening. At least one new data jack in said new data jack face plate is connected to the at least one data communication wire and the new data jack face plate attached to the fully assembled poke-through device.

A receptacle assembly of the present invention, which may be adapted for use in a poke-through device, comprises a receptacle with an electrical outlet coupled thereto, and a receptacle bottom plate secured to the receptacle. The electrical outlet further includes a hot electrical contact, a ground electrical contact, and a neutral electrical contact, each of which includes a crimping connection. Additionally, the bottom plate includes a plurality of pins protruding therefrom, each of the contacts being supported by one of the plurality of pins, wherein each one of the plurality of pins has a length sufficient to allow routing of a ground conductor, a neutral conductor, and a hot conductor inside the receptacle. The plurality of pins may be molded to said bottom plate.

The receptacle assembly according to the present invention may further include four electrical outlets, which may be positioned radially along a semicircular arc. The four electrical outlets may further be positioned so that the ground electrical contact of each of three electrical outlets is aligned with the neutral electrical contact and the hot electrical contact of a fourth electrical outlet along an inner semicircular arc, and the neutral electrical contact and the hot electrical contact of each of three electrical outlets is aligned with the ground electrical contact of the fourth electrical outlet along an outer semicircular arc.

The receptacle assembly may further comprise a data jack face plate, including at least one data jack, preferably four data jacks, coupled to said data jack face plate. Additionally, the receptacle may include a top surface, said top surface being noncoplanar with the data jack face plate, wherein the data jack face plate is separately removable from the receptacle.

A method of the present invention for assembling a receptacle assembly for use in a poke-through device is also provided, wherein the receptacle assembly includes an electrical receptacle region, the electrical receptacle region having a receptacle and a receptacle bottom, the receptacle including an electrical outlet, wherein the electrical outlet has a ground contact, a neutral contact, and a hot contact. The method includes the steps of: crimping a ground conductor to a crimping connection on the ground contact; crimping a neutral conductor to a crimping connection on the neutral contact; and crimping a hot conductor to a crimping connection on the hot contact. The method further includes inserting the contacts into the receptacle to form the electrical outlet, and routing the hot conductor, the neutral conductor and the ground conductor inside the receptacle. Additionally, a receptacle bottom plate is secured to the receptacle, said receptacle bottom plate including a plurality of pins protruding from the receptacle and positioned to push on and support the hot electrical contact, the ground electrical contact, and the neutral electrical contact of the electrical outlet. The method may also include the step of securing the data jack face plate to the electrical receptacle region.

The present invention also provides a floor structure having upper and lower surfaces defining a floor thickness and having a poke-through receiving hole formed therein, said receiving hole extending in a direction generally perpendicular to said upper and lower surfaces, in combination with a flush poke-through device. The flush poke-through device includes a body having an upper and a lower end, and sized for insertion within said receiving hole. The upper end includes a receptacle region, which includes a receptacle, at least one electrical outlet being coupled thereto. The lower end communicates with a junction box. The receptacle further has an upper surface facing the upper surface of the floor structure.

The flush poke-through device also includes a data jack face plate, wherein at least one data jack is coupled thereto, said data jack face plate facing the upper surface of the floor structure and being noncoplanar with the receptacle, and a flange mounted to said upper surface and having an opening that provides access to the at least one electrical outlet and the at least one data jack.

The data jack face plate is sized for removal through the at least one opening and secured within the receptacle region by at least one fastener, which is accessible for removal through the opening of the flange. The data jack face plate may be both installed and uninstalled without removal of the flange.

The receptacle region and data jack face plate are retained in the receiving hole of the combination at a distance below the upper surface of the floor structure which is sufficient to prevent interface of the receptacle region, the data jack face plate, and typical connectors secured thereto, with objects and persons located on said upper surface of said floor structure.

As a result, the present invention provides a flush poke-through device that provides both electrical power outlets and data communication ports, and allows easy interchangeability of data jack mounts and flexibility in the electrical power outlet orientation.

BRIEF DESCRIPTION OF THE DRAWINGS

FIG. 13 is a view of the conductors after being stripped to allow assembly to the electrical contacts.

DETAILED DESCRIPTION OF THE INVENTION

The device formed in accordance with the present invention provides a flush poke-through fitting that allows easy access to the data plate, which can be removed and replaced without interruption of electrical power and without additional disassembly of the poke-through device. An additional embodiment includes a receptacle with increased room to accommodate various wiring schemes and orientations of the electrical outlets. Although the present application refers generally to running of electrical power and data cables, it is to be understood that fiber optic cables or similar structures are also within the scope of the invention.

Figure 1:
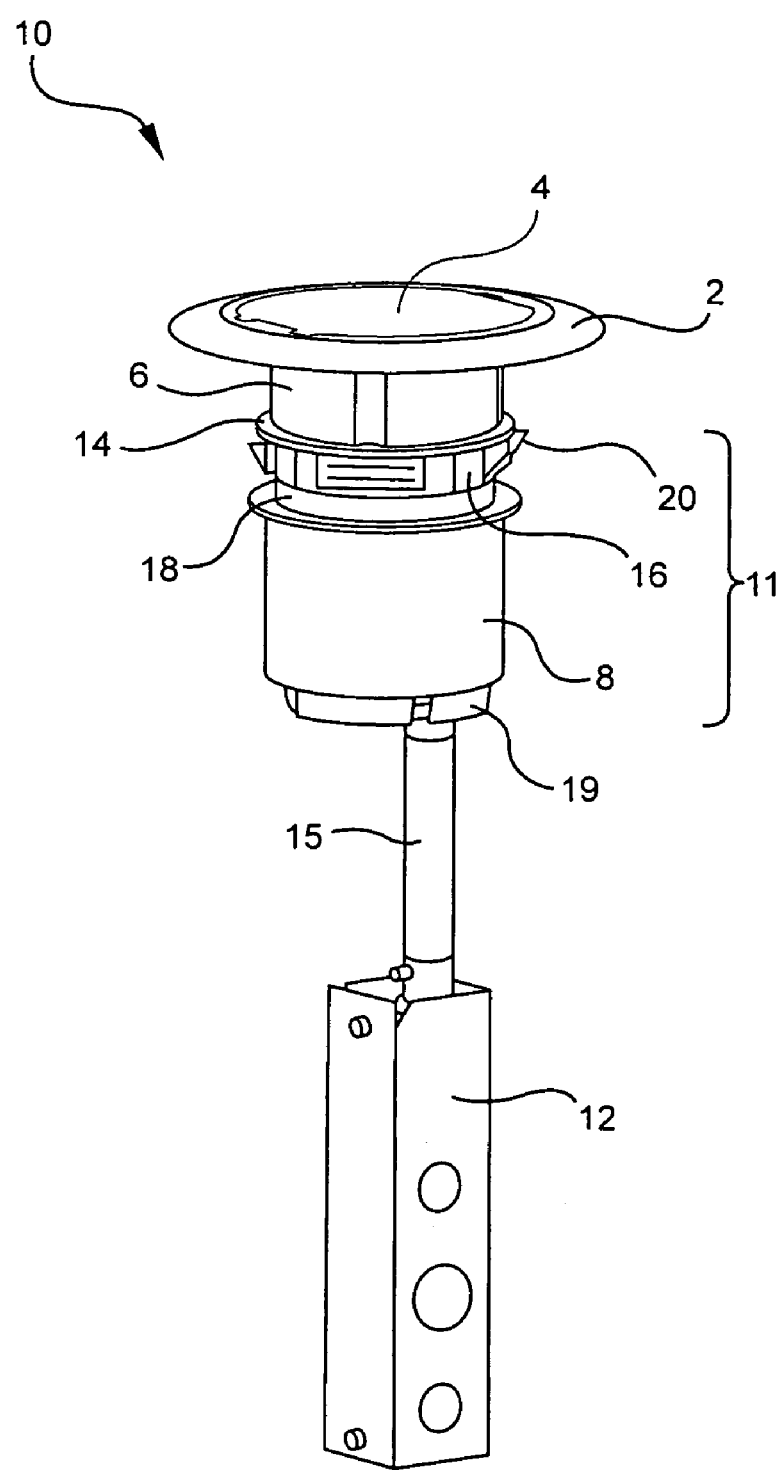
FIG. 1 is a perspective view of a poke-through fitting formed in accordance with the present invention.

Initially, FIG. 1 shows the assembled flush poke-through fitting formed in accordance with the present invention, designated generally as 10, with the cover 4 closed on the carpet flange 2. The flush poke-through fitting 10 formed in accordance with the present invention may be sized to fit within a two- to four-inch diameter hole. In a preferred embodiment, fitting 10 is sized to fit into a four-inch diameter hole.

As shown in FIG. 1, retainer clips 20, which have an angled projection, allow for easy insertion of the device 10 into an interfloor receiving hole, and prevent subsequent withdrawal of the device 10 from the hole. A cylindrical housing 8, which is sized to fit into a hole formed in a concrete floor, surrounds a tubular body 19. The cylindrical housing 8 is comprised of an intumescent material and acts as a fire wall, preventing fire from traveling through the hole formed in the concrete floor. The upper portion of the tubular body attaches to a spacer 18. The upper portion of spacer 18 attaches to smoke ring 16. The construction of retainer clips 20, spacer 16, smoke ring 18, cylindrical housing 8, and tubular body 19 associated with fire-rated poke-through fittings are generally known in the art and will not be described in detail herein. These elements are encompassed within the lower portion 11 of a poke-through device.

Figure 2:
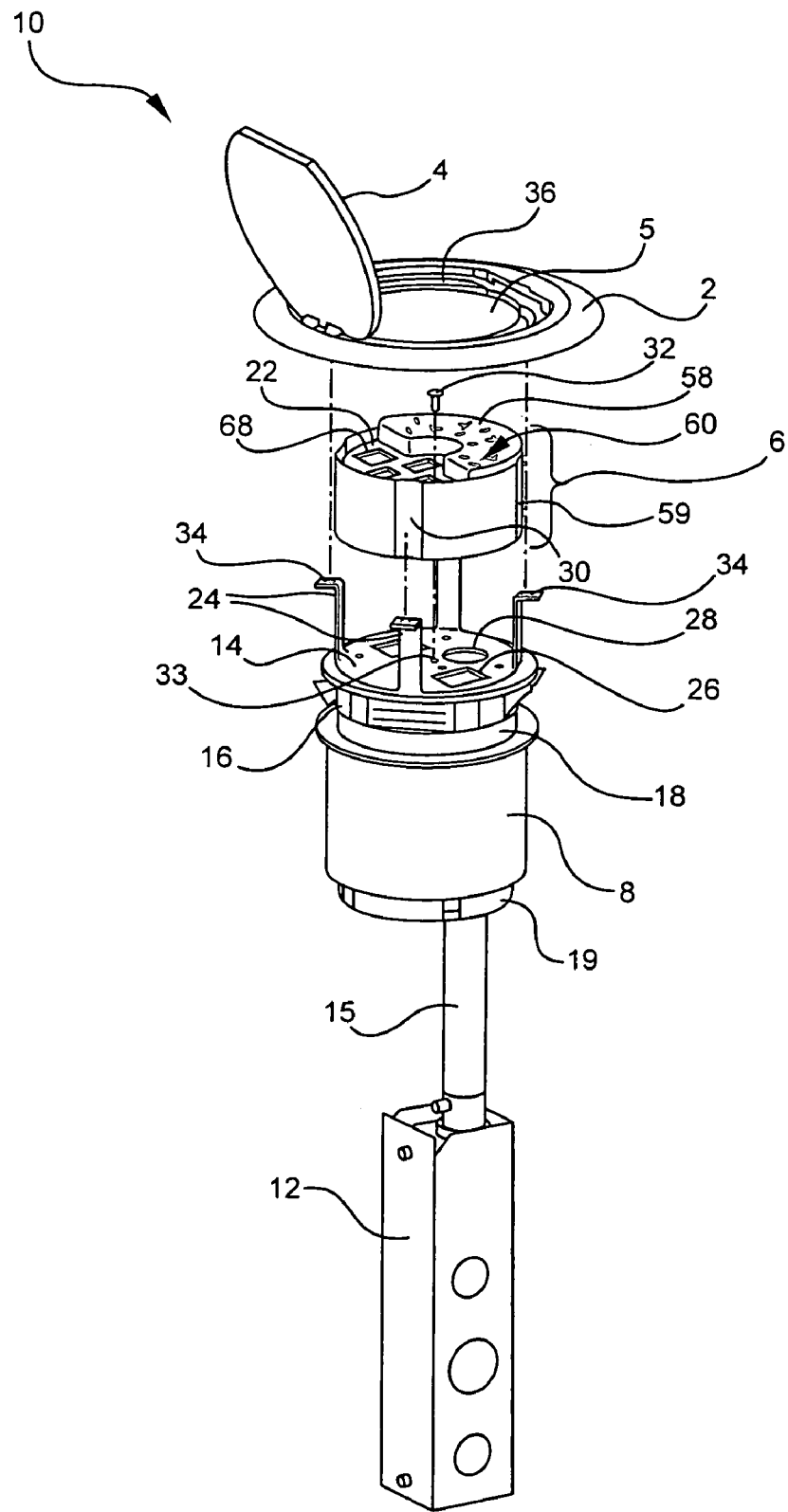
FIG. 2 is a perspective view, partially exploded, of the upper portion of the poke-through fitting of FIG. 1.

Referring to FIG. 2, the retainer clips 20 are preferably positioned between a receptacle mounting plate 14 and spacer 18. The receptacle mounting plate 14 preferably includes two (2) substantially rectangular apertures 26 that allow a routing path for the data communication wires (not shown), and a substantially circular aperture 28 that allows a routing path for electrical conductors 38 (see FIG. 3). A receptacle 58 is secured to the top portion of receptacle mounting plate 14 via a structural collar 59.

As shown in FIG. 2, a data jack face plate 22 is secured to receptacle region 6. According to the present invention, the data jack face plate 22 is able to be removed and replaced through the open cover 4 on the carpet flange 2 without disassembly of any other part of a fully-assembled poke-through device 10. Accordingly, the data jack face plate 22 is sized to fit through the inner diameter of the access aperture 5 in the carpet flange 2.

As best shown in FIG. 2, the data jack face plate 22 preferably includes four substantially rectangular apertures 68 for mounting four data jacks. Additionally, in a preferred embodiment, the data jack face plate 22 comprises a substantially semicircular shape.

Referring again to FIG. 2, the data jack face plate 22 is also preferably recessed relative to the top face of the receptacle 58, as well as substantially adjacent the receptacle 58, to prevent any interference between electrical power and data communication lines. The placement of the data communication jacks, represented by apertures 68, on a separately removable data jack face plate 22, secured to the top of receptacle region 6, has the advantages over the prior art of being removable without interruption of the electrical power to a particular work area, and without further disassembly of the poke-through fitting.

Figure 3:
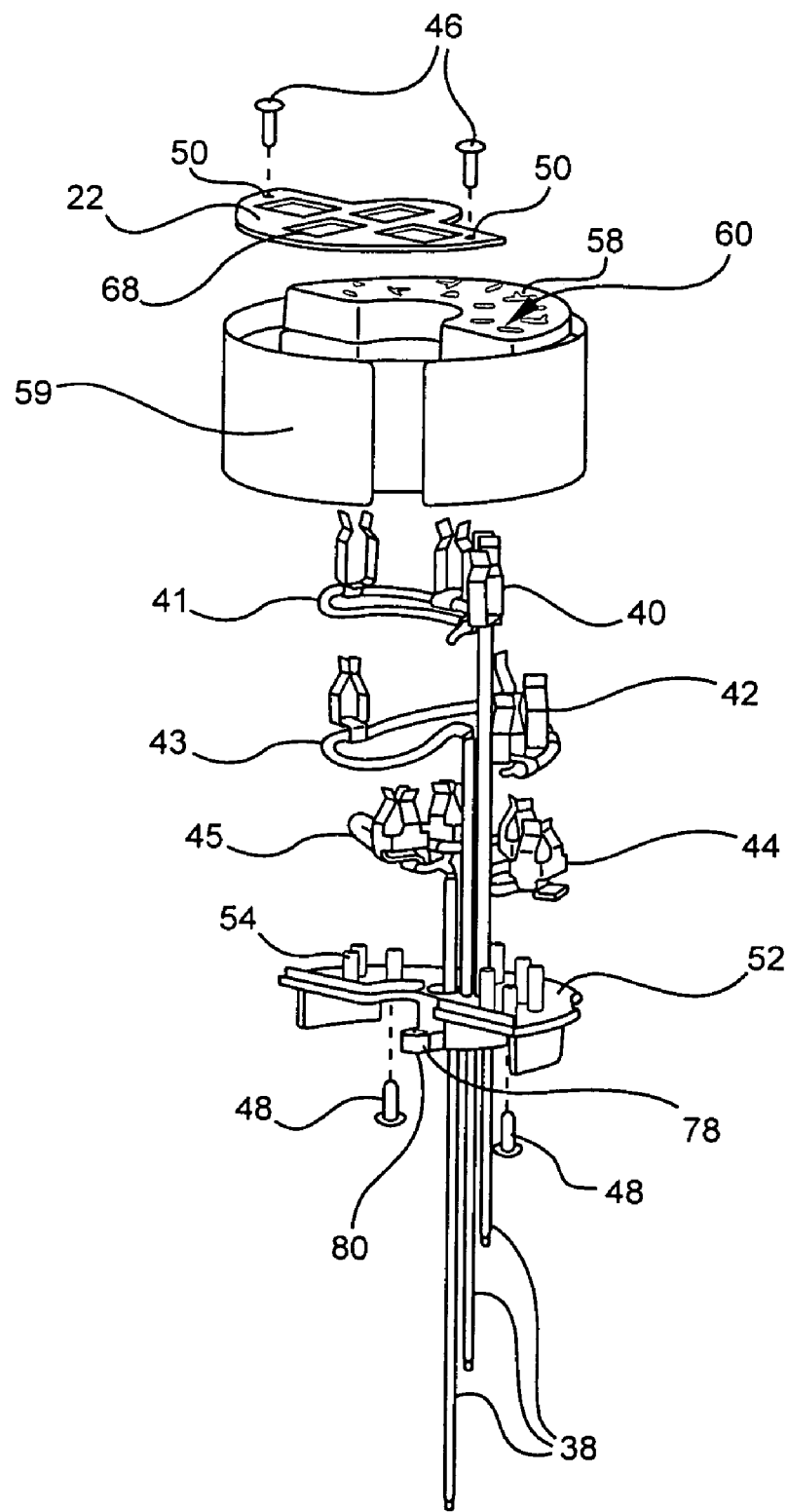
FIG. 3 is an exploded perspective view of the receptacle region of FIG. 2, showing the routing of the conductors into the receptacle.

The receptacle region 6 formed in accordance with the present invention (see FIGS. 1 and 2) preferably includes a receptacle 58, which houses the electrical outlets 60, and a receptacle bottom plate 52, shown in FIG. 3 before assembly of the receptacle region. Receptacle region 6 further includes a structural collar 59, which is adapted for securing the receptacle 58 to the lower portion 11 of the poke-through 10, preferably via mounting plate 14.

In a preferred embodiment, the structural collar 59 substantially surrounds the receptacle 58 and comprises a cylindrical shape with an outer diameter appropriately sized for fitting into an interfloor receiving hole formed in the concrete floor. Additionally, the structural collar 59 is preferably integral to the receptacle 58, forming one piece preferably composed of a plastic material. Alternatively, a structural collar 59 for securing the receptacle 58 to the lower portion of the poke-through is a separate unit to which the receptacle 58 is attached, for example, with threaded screws. As another alternative, a structural collar 59 may be integral to a receptacle mounting plate 14, forming a receptacle mounting region via which the receptacle is secured to the lower portion 11 of the poke-through device.

Figure 4:
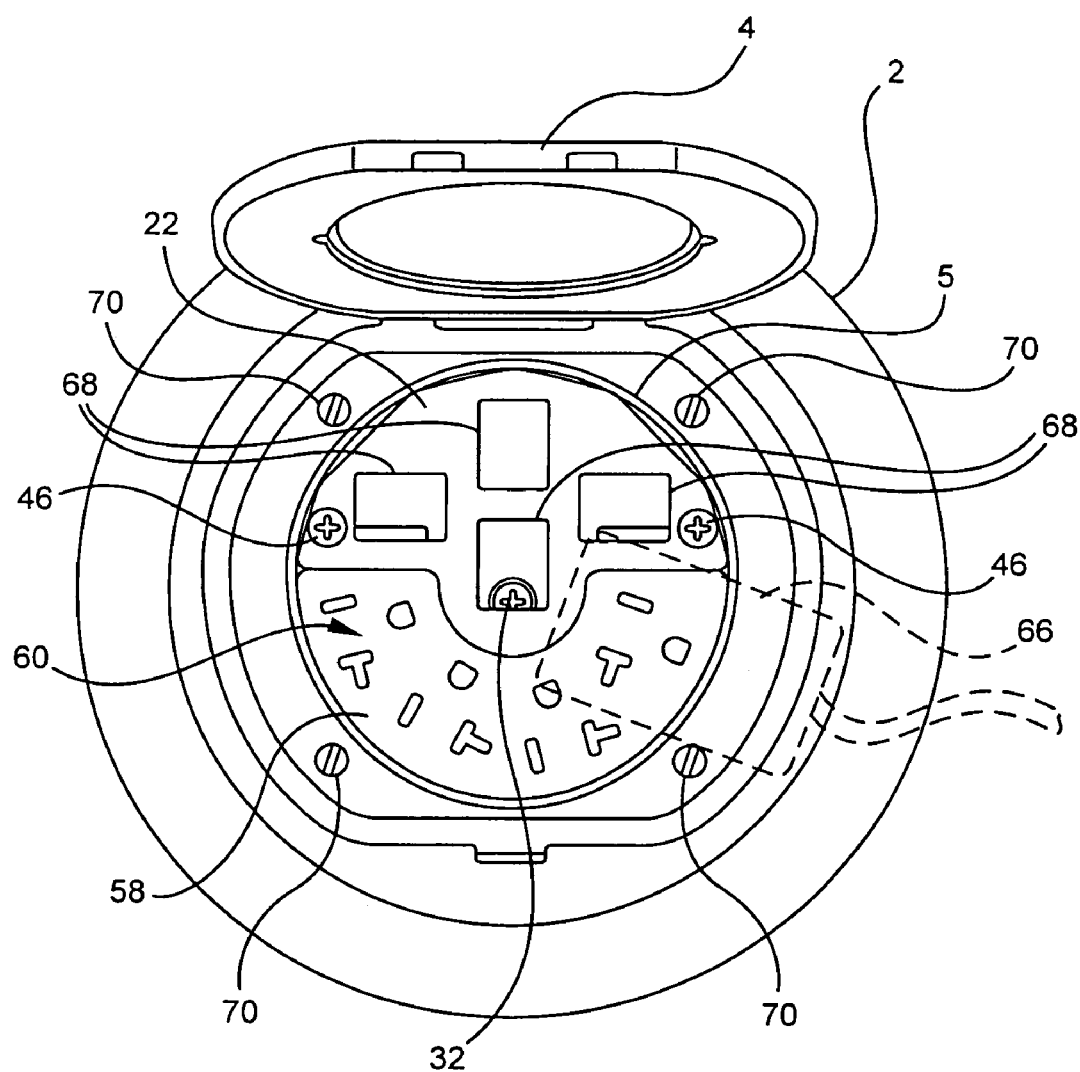
FIG. 4 is the top view of the poke-through fitting of FIG. 1, shown with the cover open, and showing an outline view of a typical cell phone adapter in one outlet plug.

Referring to FIGS. 3 and 4, receptacle 58 includes the electrical outlets 60. In a preferred embodiment, the receptacle 58 includes four electrical outlets 60. Additionally, the receptacle 58 is preferably substantially semicircular in shape, and substantially adjacent to the data jack face plate 22.

Figure 5:
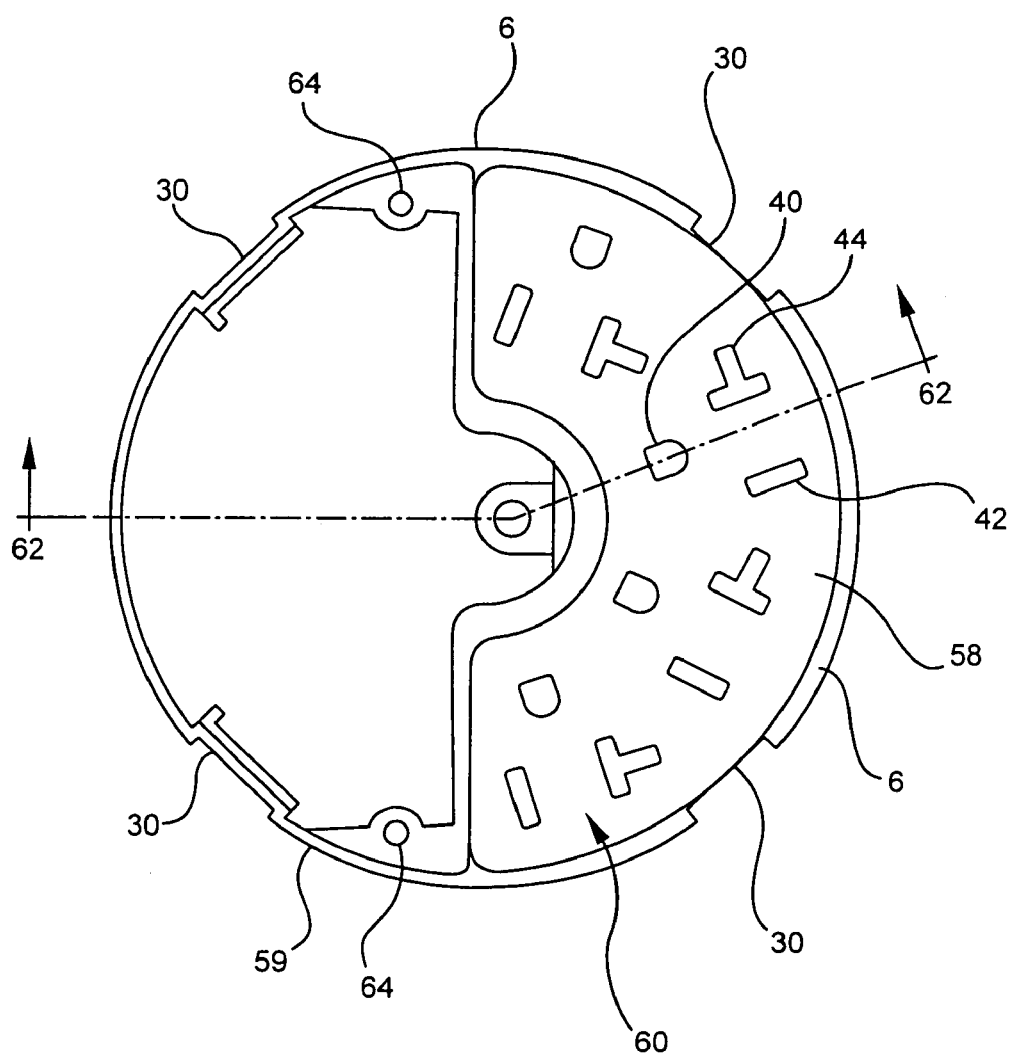
FIG. 5 is a top view of the receptacle region, after assembly of the receptacle in accordance with FIG. 3.

FIG. 5 is a top view of a preferred embodiment of the assembled receptacle region 6 formed in accordance with the present invention, showing the preferred location and orientation of the four electrical outlets 60, located radially along an arc in the receptacle 58. The electrical outlets 60 are preferably configured for receipt of conventional 110-volt electrical plugs. Optionally, the outlets 60 may be configured for receipt of other types of plugs. As seen in FIG. 4 and FIG. 5, in a preferred embodiment, one of the four electrical outlets 60 is rotated by 180 degrees in relation to the remaining three.

FIG. 4 shows a top view of the preferred embodiment, after assembly, with the cover 4 open. An outline of a typical cell phone adapter 66 is shown in the one electrical outlet 60 that has been rotated 180 degrees in relation to the other electrical outlets 60. As illustrated by FIG. 4, this preferred embodiment advantageously allows the use of cell phone adapter 66, or other adapters, without prohibiting the use of the other electrical outlets 60 or data jacks, represented by apertures 68.

Referring to FIGS. 4 and 5, the receptacle region 6 further includes means for supporting and securing the data jack face plate 22 thereto. As best shown in FIG. 5, two threaded holes 64 are preferably provided on the structural collar 59 of the receptacle region 6. As best seen in FIG. 3, two screws 46 threadingly engage holes 64 to secure the face plate 22 to the top of region 6 via through holes 50. Referring to FIGS. 2 and 3, these screws 46 are directly accessible through the access opening 5 of the poke-through fitting 10, allowing the data jack plate 22 to be removed without disassembly of the carpet flange 2 or any other part of the poke-through device 10. In addition, the data jack face plate 22 is removable without having to disturb electrical power to the electrical outlets 60 in the receptacle 58.

Figure 5A:
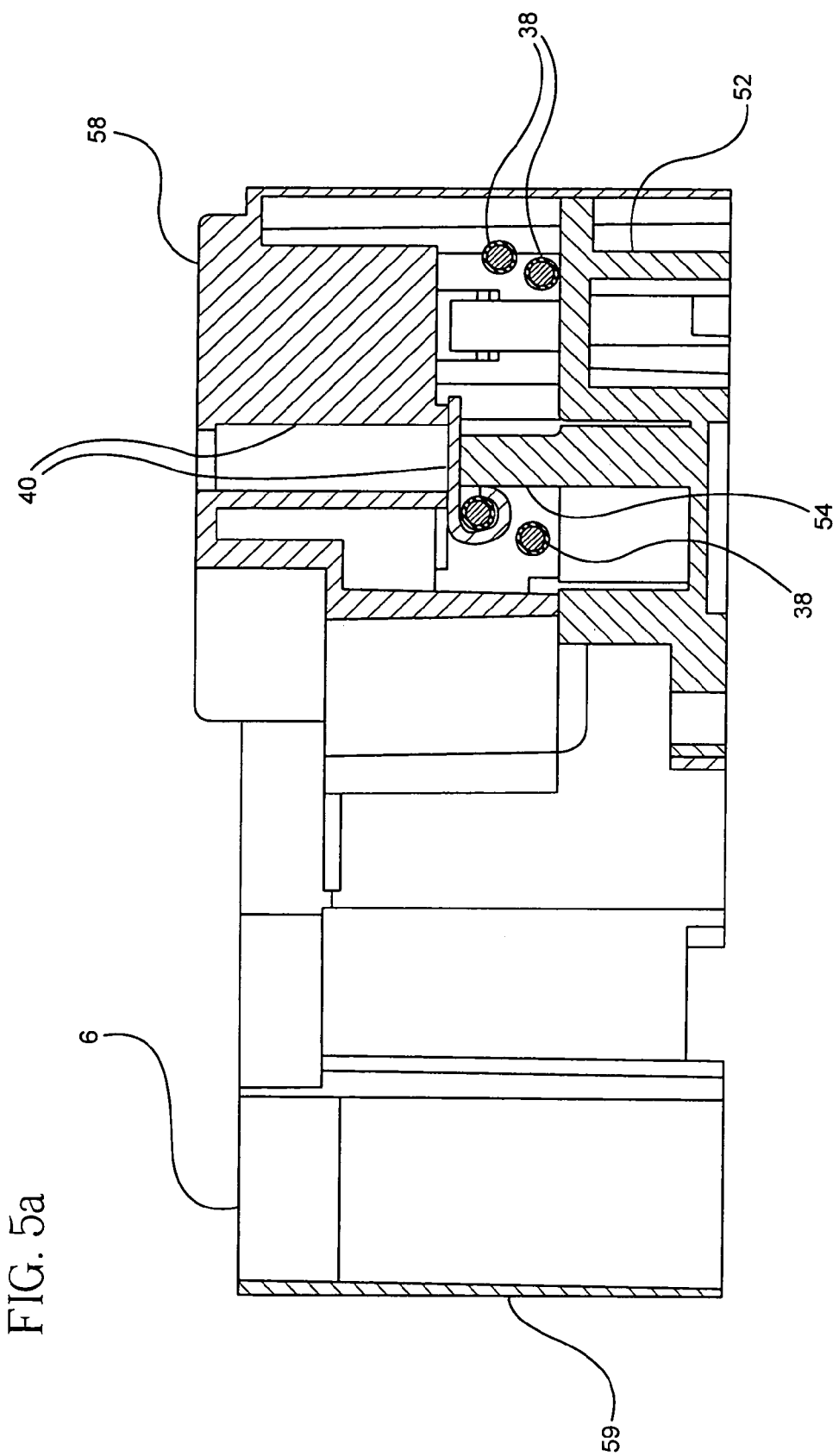
FIG. 5a is a cross section through the assembled receptacle shown in FIG. 5.

FIG. 5a is a cross sectional view through the assembled receptacle region 6, shown in FIG. 5, along the line 62. As shown in FIG. 5a, pins 54 in the receptacle bottom plate 52 push against the electrical contacts (the ground contact 40 in FIG. 5a) when the receptacle region 6 is assembled. The pins 54 in the receptacle bottom plate 52 are preferably positioned so that each one pushes against the center of one of the electrical contacts to provide structural support once the receptacle 58 is wired and assembled. In addition, the pins 54 serve as spacers to provide additional room inside the receptacle 58 for routing the electrical power conductors 38, as shown in FIG. 3.

One preferred orientation of the electrical outlets 60 is represented in the preferred embodiment shown in the figures. It should be noted that alternate embodiments incorporating different orientations, numbers, and types of power outlets are also possible, simply by replacing the receptacle 59 with one having the desired electrical outlets arranged in the desired pattern, and reconfiguring the pins in the receptacle bottom 52. This flexibility is possible because of the pins that are used to hold the contacts in place and to increase space for wiring, thereby avoiding restrictive bus bar configurations.

Figure 6:
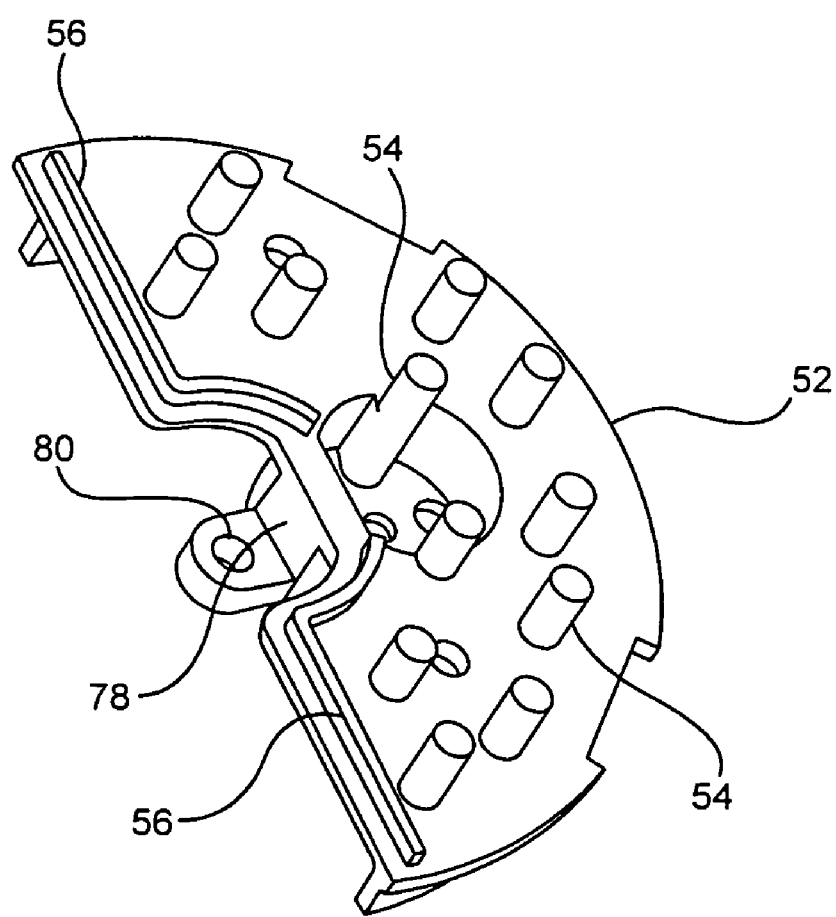
FIG. 6 is a perspective view of the top of the receptacle bottom plate.

As best seen in FIG. 6, these pins 54 extend from the top surface of the receptacle bottom plate 52. The pins 54 may be integrally formed with plate 52, or separately secured thereto. The plate 52 further preferably includes two discontinuous ribs 56 located proximate the inside edge of the top surface of the receptacle bottom plate 52, which cooperate with the inside edge of the receptacle 58 during assembly of the receptacle region 6.

Figure 7:
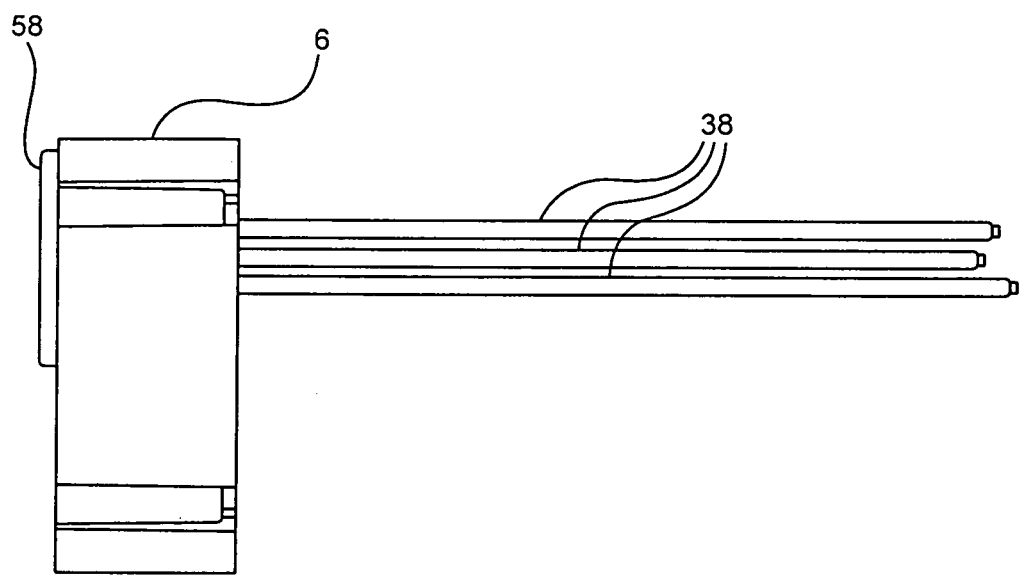
FIG. 7 is a side view of the receptacle region shown in FIG. 5.
Figure 8:
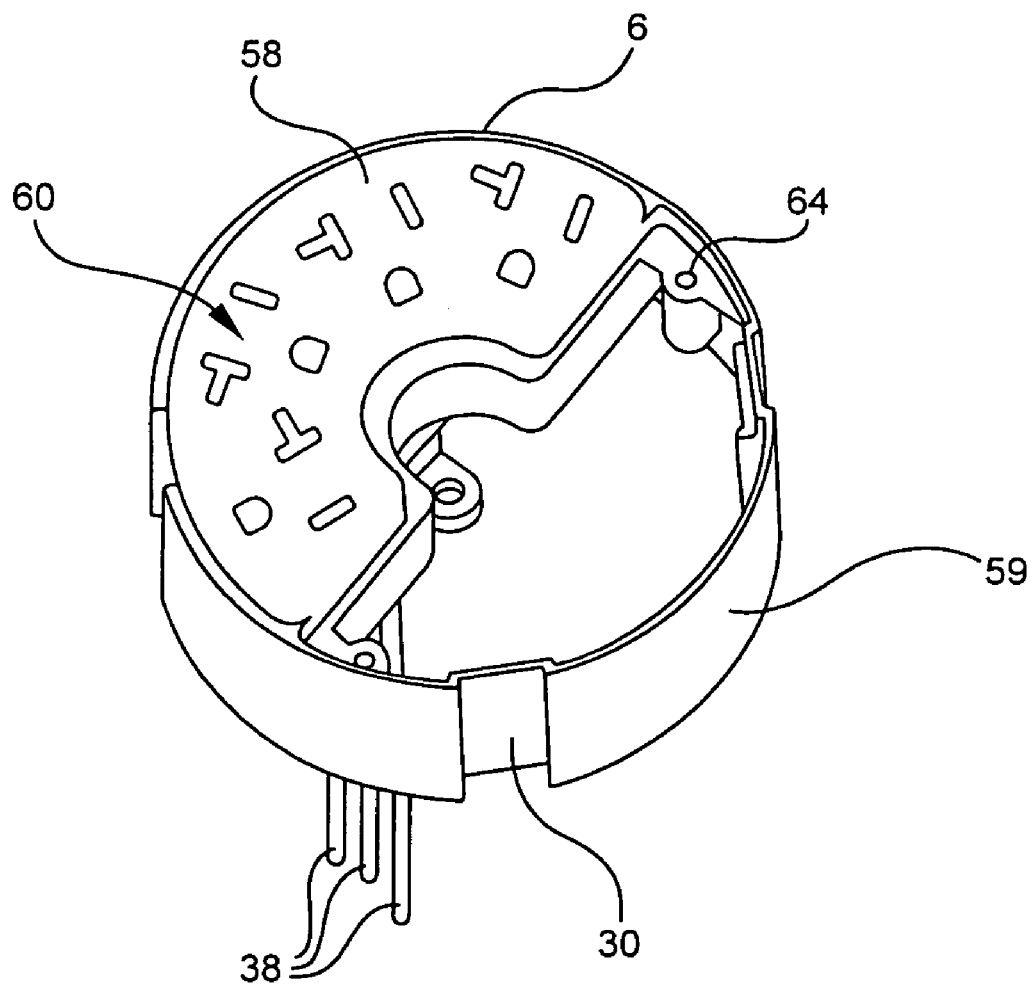
FIG. 8 is a perspective view of the top of the receptacle region, with assembled receptacle, as shown in FIG. 5.

FIGS. 7 and 8 are side and perspective views of the receptacle region 6, respectively, after wiring of the conductors 38 into the receptacle 58, and attaching the bottom plate 52.

Figure 9:
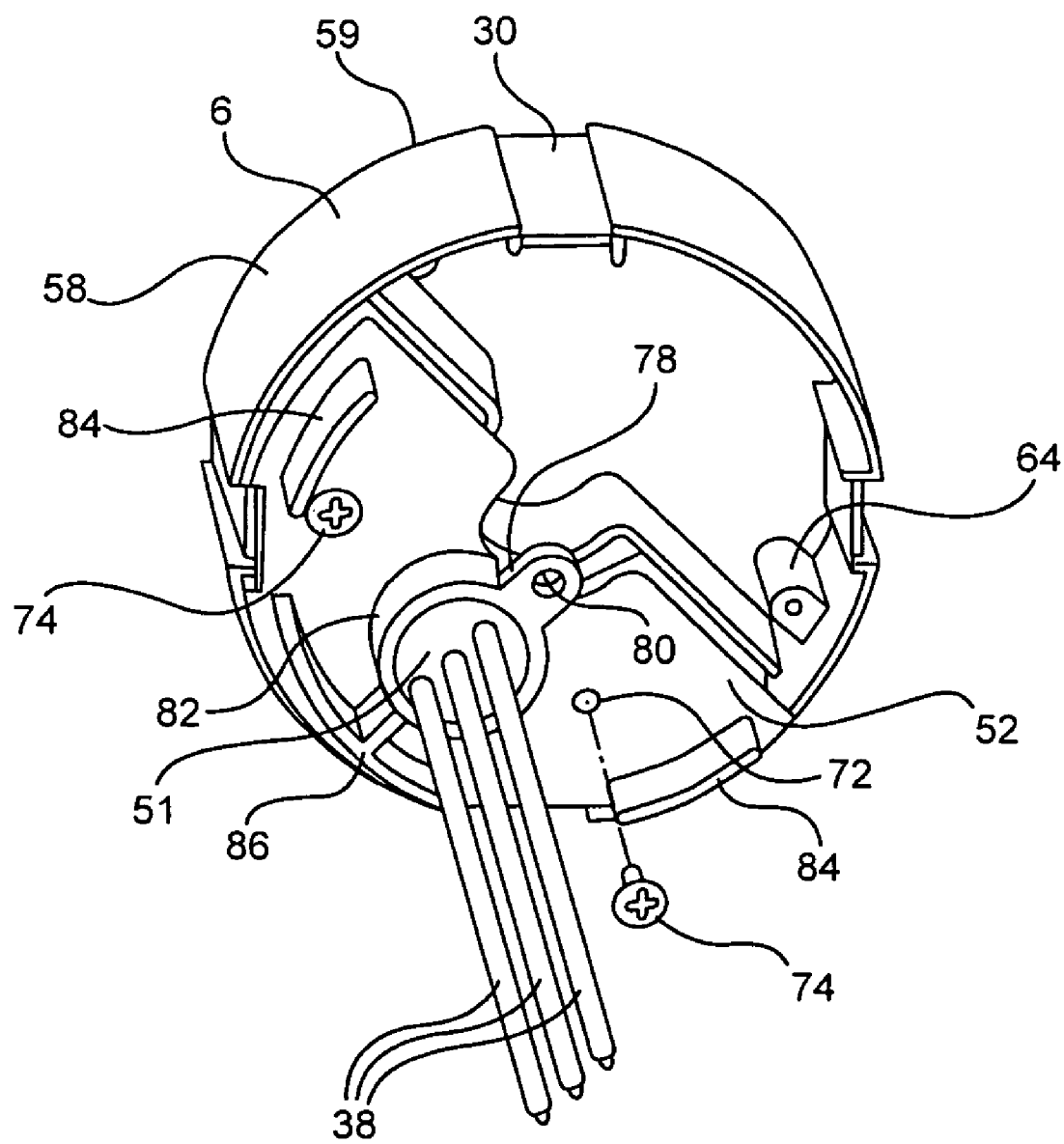
FIG. 9 is a bottom perspective view of the receptacle region of FIG. 5, showing the bottom of the receptacle bottom plate.
Figure 10:
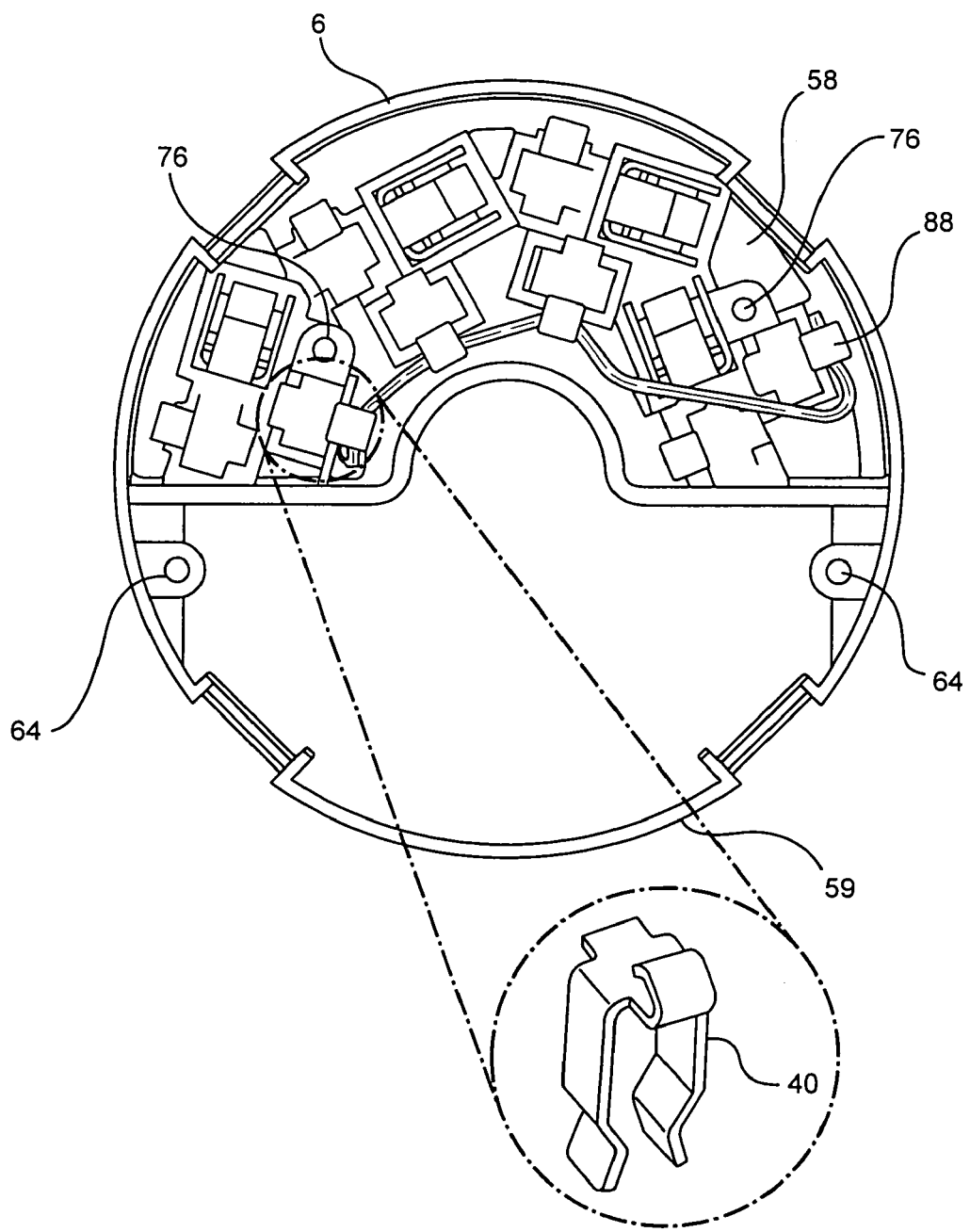
FIGS. 10, 11 and 12 are bottom views of the receptacle region, showing routing of the ground, neutral and load conductors, respectively, in the receptacle.
Figure 11:
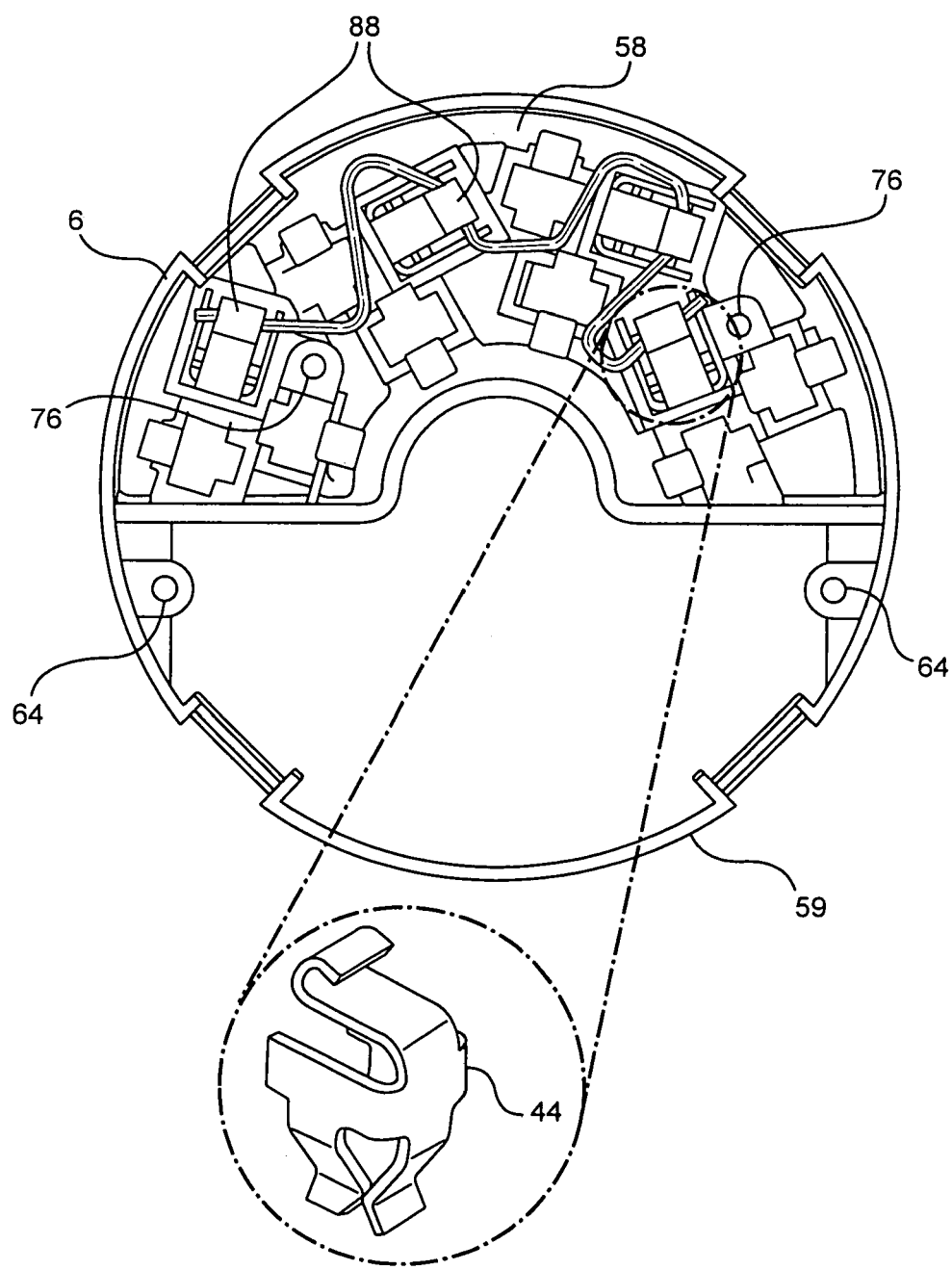
Figure 12:
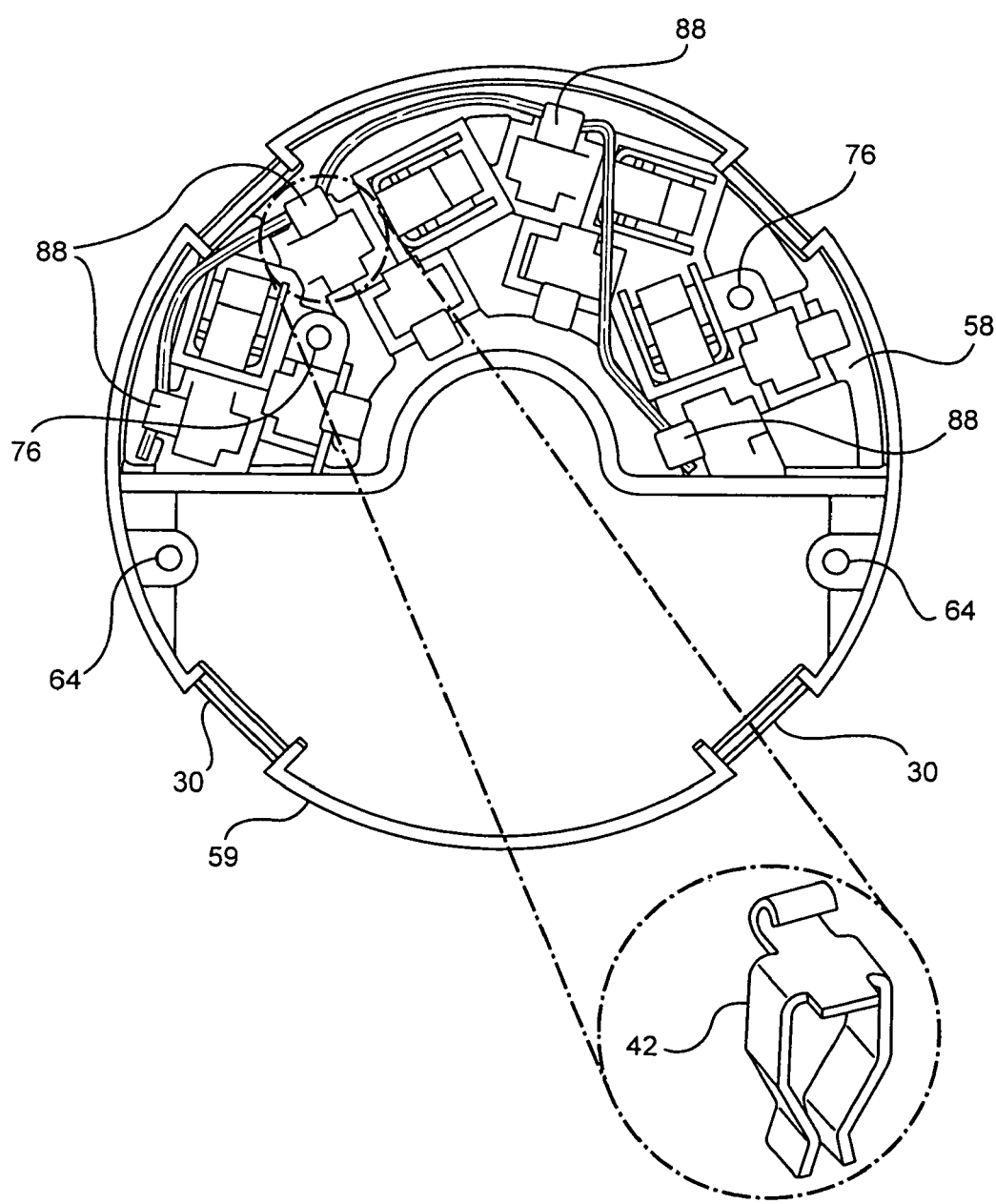

FIG. 9 is a bottom perspective view of the receptacle region 6 after wiring of the outlets 60 in accordance with FIGS. 10–12, showing the assembly of the receptacle bottom plate 52 to the receptacle 58.

The electrical conductors 38 are routed as shown in FIGS. 10–12 before completing assembly of the receptacle region 6 by attaching the bottom plate 52, as shown in FIG. 3. As seen in FIG. 13, before routing the electrical conductors 38, each conductor 38 is stripped at designated locations 90 along its length. As best shown in FIG. 3, the hot conductor 43 is then crimped to each of the hot contacts 42, the neutral conductor 45 is crimped to each of the neutral contacts 44, and the ground conductor 41 is crimped to each of the ground contacts 40, before installation of the contacts to form electrical outlets 60.

Referring again to FIGS. 10–12, the stripped sections of the conductor 90 are preferably crimped to crimping connections 88 on the electrical contacts, using means well-known to those skilled in the art. FIGS. 10, 11, and 12 show the stripped sections of a conductor 90 crimped to the ground 40, neutral 44, and load 42 contacts, respectively, and the routing of conductors 38 within the receptacle 58 to form preferably four outlets 60.

The fully-assembled receptacle region 6 and the integration of the receptacle region 6 to the lower portion 11 of the poke-through device are best described by reference to FIG. 9. Two through holes 72 are located on the bottom of receptacle bottom plate 52 to cooperate with two threaded holes 76 (see FIGS. 10–12) in the bottom of the receptacle 58, using screws 74 to threadingly engage holes 76 and secure the receptacle bottom plate 52 thereto. The assembled receptacle region 6 is then secured to the receptacle mounting plate 14. The receptacle bottom plate 52 preferably includes a leg 78 with a through hole 80 (see also FIG. 6) located to cooperate with the center threaded hole 33 on the receptacle mounting plate 14 (see FIG. 2). The screw 32 in FIG. 2 threadingly engages center hole 33 to secure the assembled receptacle region 6 to the receptacle mounting plate 14.

Referring further to FIG. 9, a short hollow cylinder 82 preferably extends from a substantially circular aperture 51 in the bottom of the receptacle bottom plate 52. Electrical conductors 38 are routed from the junction box 12 and conduit 15 (see FIG. 1) through the aperture 51 to the electrical outlets 60 (see FIG. 8) in the receptacle 58. Cylinder 82 is centered to a similarly sized, substantially circular aperture 28 in the receptacle mounting plate 14 (see FIG. 2). The apertures 28 and 51 and cylinder 82 form a passageway for the electrical conductors 38 through the poke-through fitting 10. The hollow cylinder 82 is further connected to a rib 86 located proximate to the circumference of the receptacle bottom plate 52. Two additional ribs 84 are preferably located along the same arc radius as rib 86.

As best shown in FIG. 2, ribs 86 and 84 guide the positioning of the receptacle region 6 for assembly onto the receptacle mounting plate 14, which has an outer recessed ring. The ribs 86 and 84 rest on the outer recessed ring and the inner side walls of the ribs 86 and 84 are positioned to rest against the side wall of the inner circle of the receptacle mounting plate 14.

Referring again to FIG. 2, preferably four (4) brackets 24 protrude upward from the receptacle mounting plate 14 for receiving the structural collar 59 of receptacle region 6 via four (4) matching recessed grooves 30 on the receptacle 58. These grooves 30 and brackets 24 key the positioning of the receptacle region 6 onto the receptacle mounting plate 14 during assembly.

The integration of the receptacle region 6 to the remaining upper portion of the poke-through device is best described by further reference to FIG. 2. As shown, the carpet flange 2 may be installed after the assembled receptacle region 6, with data face plate 22 attached as described above, is mounted to the receptacle mounting plate 14, completing the assembly of poke-through fitting 10. With the cover 4 in the open position, the carpet flange 2 is placed over the receptacle region 6 so that the four through holes 36 on the carpet flange 2 align with the threaded holes 34 on the top of the brackets 24. Four screws 70, (see FIG. 4), threadingly engage holes 34 to secure the carpet flange 2 to the brackets 24 on the receptacle mounting plate 14. It should be noted that the installation of the face plate 22 onto the receptacle region 6 may be performed either before, or after installing the carpet flange 2.

The data jack face plate 22 is easily removed from an installed poke-through device 10 formed in accordance with the present invention and replaced with a new data jack face plate that includes new or updated jacks. First, if plugged in, the old data plugs are unplugged from the old data jacks, represented by rectangular apertures 68. The data jack face plate 22 is detached and removed from the fully-assembled poke-through device 10 through the access opening 5 in the flange 2. In the preferred embodiment, the data jack face plate 22 is detached simply by unscrewing two threaded screws 46, shown in FIG. 3. The plate 22 is then lifted up through the center of the open carpet flange 2, shown in FIG. 2. The old data jacks are then disconnected from the communication wires, preferably by cutting or desoldering. New data jacks that are mounted in the new data jack face plate are then wired to the original or to new data communication lines, according to the desired wiring configuration, using wiring means known in the art, such as crimping and soldering. Finally, the new data jack face plate is attached to the receptacle region 6. The data jack face plate 22 can, therefore, be replaced with another prefabricated plate, with different mounting and cabling requirements, without interruption of power.

Some of the advantages of the poke-through fitting 10 formed in accordance with the present invention include: the ability to remove and change out the data plate without disassembly of any other part of the fitting and without interruption of electrical power; flexibility in the orientation of the electrical outlets; an electrical outlet arrangement that allows the use of adapters without restricting other power or data connections; improved conductor organization during assembly; and reduced complexity and cost resulting from the use of the power receptacle to support the data jack face plate.

Another advantage of the poke-through fitting formed in accordance with the present invention is provided by preferably locating the electrical outlets and data jacks on separate halves of the receptacle region. This configuration provides isolation of the low voltage data communication lines from the high voltage electrical conductors.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A flush poke-through fitting for installation in a substantially circular opening in a floor structure, said floor structure defining a floor in a first working environment and a ceiling in a second working environment, said second working environment including a junction box, comprising:
   a body having an upper and a lower end, and sized for insertion within said substantially circular opening, said upper end including a receptacle region wherein the receptacle region includes a receptacle, at least one electrical outlet being coupled to said receptacle, and said lower end communicating with said junction box;
   a data jack face plate, wherein at least one data jack is coupled to said data jack face plate;
   a flange having an opening, providing access to the at least one electrical outlet and the at least one data jack;
   said data jack face plate sized for removal through the opening in the flange and secured within said receptacle region by at least one fastener, said at least one fastener accessible for removal through the opening of the flange, whereby said data jack face plate may be both installed and uninstalled without removal of said flange.

2. The device according to claim 1, wherein the substantially circular opening is about four inches in diameter.

3. The device according to claim 1, the receptacle region further comprising:
   a hot electrical contact, a ground electrical contact, and a neutral electrical contact coupled to the at least one electrical outlet;
   a receptacle bottom plate, said receptacle bottom plate being secured to the receptacle, said receptacle bottom plate having a plurality of pins protruding therefrom, wherein each of said contacts is supported by one of the plurality of pins.

4. The device according to claim 3, wherein the plurality of pins are molded to the receptacle bottom plate.

5. The device according to claim 3, wherein the at least one electrical outlet is four electrical outlets.

6. The device according to claim 5, wherein the four electrical outlets are positioned radially along a semicircular arc.

7. The device according to claim 6, wherein the four electrical outlets are positioned so that the ground electrical contact of each of three electrical outlets is aligned with the neutral electrical contact and the hot electrical contact of a fourth electrical outlet along an inner semicircular arc, and the neutral electrical contact and the hot electrical contact of each of the three electrical outlets is aligned with the ground electrical contact of the fourth electrical outlet along an outer semicircular arc.

8. The device according to claim 1, wherein the at least one data jack is four data jacks.

9. The device according to claim 1, wherein the data jack face plate comprises a substantially semicircular shape.

10. The device according to claim 1, wherein the receptacle comprises a substantially semicircular shape.

11. The device according to claim 1, said receptacle having a top surface, said top surface being noncoplanar with the data jack face plate.

12. In combination:
    a floor structure having upper and lower surfaces defining a floor thickness and having a poke-through receiving hole formed therein, said receiving hole extending in a direction generally perpendicular to said upper and lower surfaces; and
    a flush poke-through device comprising:
       a body having an upper and a lower end, and sized for insertion within said receiving hole, said upper end including a receptacle region wherein the receptacle region includes a receptacle, at least one electrical outlet being coupled to said receptacle, and said lower end communicating with a junction box, and wherein the receptacle has an upper surface facing said upper surface of said floor structure;
       a data jack face plate, wherein at least one data jack is coupled to said data jack face plate, said data jack face plate facing said upper surface of said floor structure and being noncoplanar with said receptacle;
       a flange mounted to said upper surface and having an opening, the opening providing access to the at least one electrical outlet and the at least one data jack;
       said data jack face plate sized for removal through the at least one opening and secured within said receptacle region by at least one fastener, said at least one fastener accessible for removal through the opening of the flange, whereby said data jack face plate may be both installed and uninstalled without removal of said flange;
       said receptacle region and data jack face plate being retained in said receiving hole at a distance below said upper surface of said floor structure which is sufficient to prevent interface of said receptacle region, data jack face plate, and a typical connector secured thereto, with objects and persons located on said upper surface of said floor structure.

* * * * *